Aug. 7, 1923.                                                            1,464,405
J. F. BORST ET AL
BRUSH FOR TALKING MACHINES
Filed Nov. 5, 1921
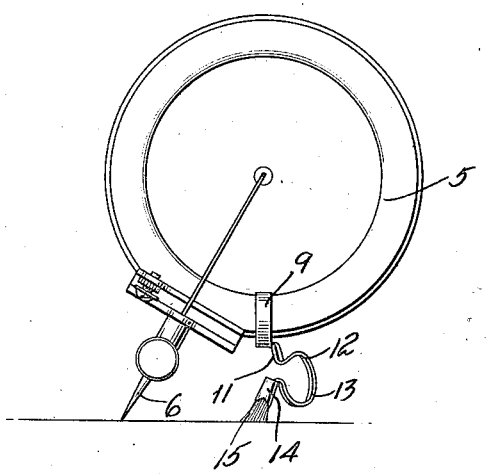
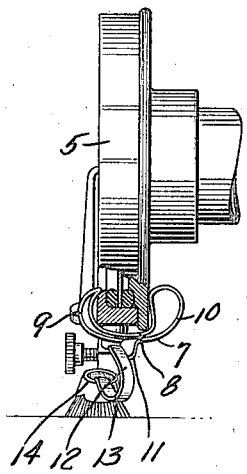
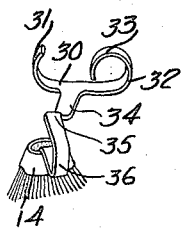
WITNESSES
Frederick Diehl.
P. H. Pattison.
INVENTORS
JOSEPH F. BORST
WILLIAM BOST
BY
Munn & Co.
ATTORNEYS Patented Aug. 7, 1923.

1,464,405

UNITED STATES PATENT OFFICE.

JOSEPH F. BORST AND WILLIAM BORST, OF BROOKLYN, NEW YORK.

BRUSH FOR TALKING MACHINES.

Application filed November 5, 1921. Serial No. 513,020.

*To all whom it may concern:*

Be it known that we, JOSEPH F. BORST and WILLIAM BORST, both citizens of the United States, and residents of the city of New York, borough of Brooklyn, in the county of Kings and State of New York, have invented a new and Improved Brush for Talking Machines, of which the following is a full, clear, and exact description.

The present invention relates to new and useful improvements in brushes for talking machines, and it pertains more particularly to a single brush therefor such as disclosed in our prior application for patent filed February 1, 1921, and allowed October 12, 1921.

It is one of the objects of the present invention to provide a brush capable of attachment to the sound box of talking machines in such a manner that the brush will travel in the path of the stylus of said sound box and remove foreign material therefrom.

It is a further object of the invention to construct a frame for supporting the brush of material which has low qualities for sound transmission.

It is a further object of the invention to so construct the frame for holding the brush that the latter will be resiliently carried relatively to the sound box upon which it is mounted.

It is a further object of the invention to so construct the frame that the brush will be carried by a resilient arm projecting therefrom.

It is a still further object of the invention to so construct the frame that the same is yieldingly mounted upon the sound box to which it is attached.

With the above and other objects in view, reference is had to the accompanying drawings, in which—

Figure 1 is a side view of a sound box equipped with a brush constructed in accordance with the present invention;

Fig. 2 is a detail sectional view showing the specific manner in which the brush is attached to the sound box, and Fig. 3 is a perspective view of a modified form of brush.

Referring more specifically to the drawings, the reference character 5 designates a sound box, and 6 designates the stylus thereof.

In the preferred form of the invention, the framework 7 is constructed from a strip of celluloid or other suitable combination which has low quality of sound conductivity. This strip is bent to provide a substantially U-shaped portion 8 adapted to embrace the edge of the sound box 5, and projecting from one end of the U-shaped portion 8 is an arm 9 or the like, which extends downwardly under the base of the U-shaped portion 8 as more clearly shown in Fig. 2. That portion of the frame extending from the opposite side of the U-shaped member and designated by the reference character 10, projects downwardly and has an offset portion 11 therein. Projecting from the offset portion 11, is an arm 12, which is curved backwardly as at 17 and carried upon the free end of the arm 12 is a brush head 14 from which project the bristles 15 of the brush.

By this construction it is apparent that the U-shaped member 8 provides means for frictionally engaging the frame with the edge of the sound box. In addition, the portions 9 and 10, which project from the upper ends of the legs of the U-shaped member and serve to carry the brush, provide means by which the frame is resiliently mounted with respect to the U-shaped portion 8 thereof.

It is apparent, due to the long looped structure of the arm 12 and the offset portion of the extension 10, that the brush is resiliently mounted with respect to the frame portion of the device, and will at all times be maintained in contact with the record and follow the path of travel of the stylus 6 of the sound box 5.

In the form of the invention shown in Fig. 3, the device comprises a U-shaped member 30 having legs 31 and 32. The leg 32 is turned inwardly as at 33, to provide tension means for gripping the edge of the sound box to secure the brush in position thereon. Projecting from the U-shaped member 30, is an arm 34, and this arm has an offset portion 35 and a looped portion 36 to which the brush head 14 is secured. In this form of the invention it is only necessary to snap the device over the edge of a sound box and the inturned portion 33 thereof forms resilient means for gripping the sound box to maintain the device in place thereon.

We claim:

A brush holder for the sound box of a talking machine, comprising two U-shaped frame members secured together and lying one within the other in spaced relation, the outer frame member having a loop formation at one side and provided with an integral brush carrying arm projecting from one edge, said arm being offset adjacent the frame and then curved downwardly and rearwardly under the frame members.

JOSEPH F. BORST.
WILLIAM BORST.